UNITED STATES PATENT OFFICE.

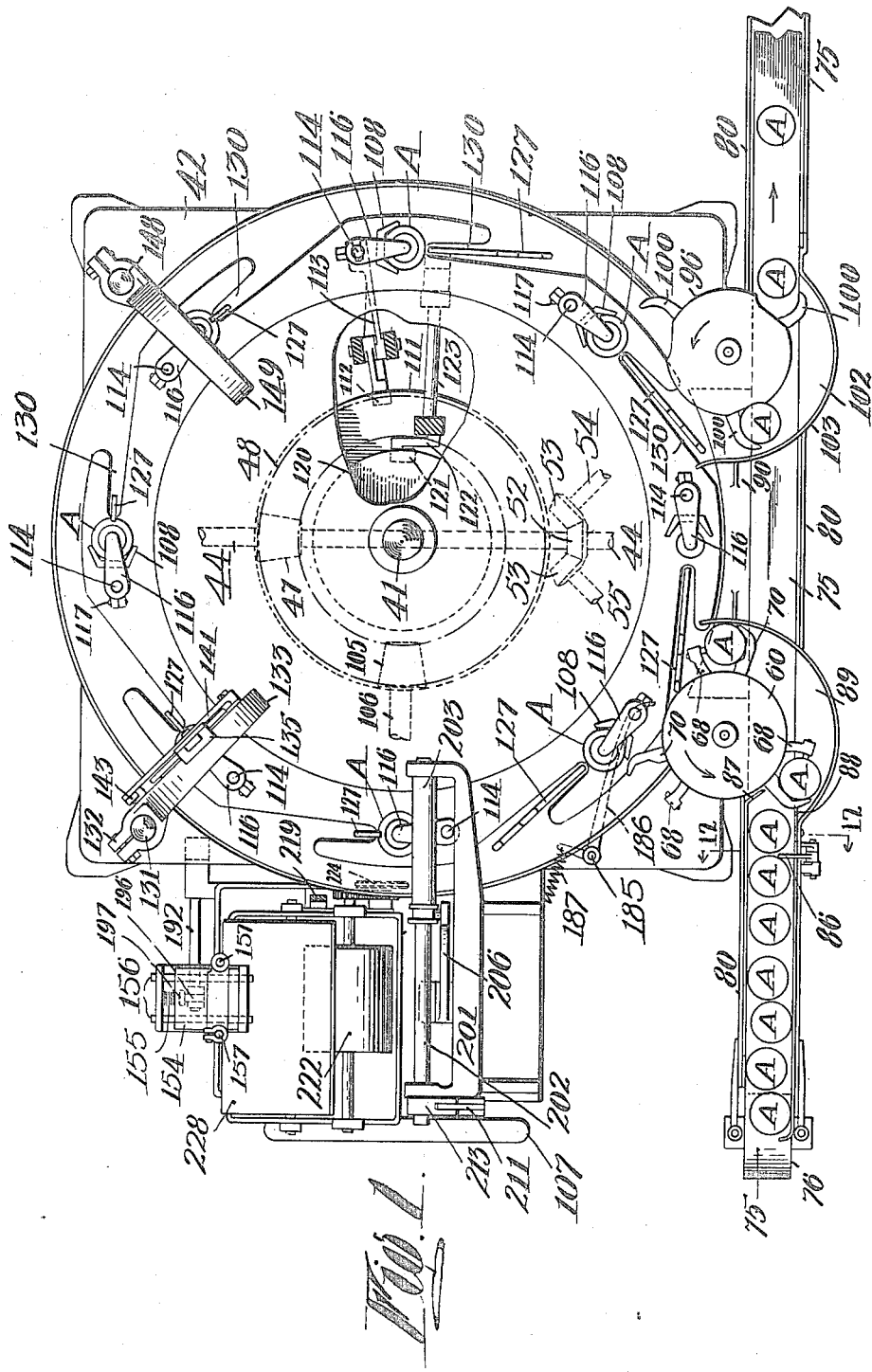

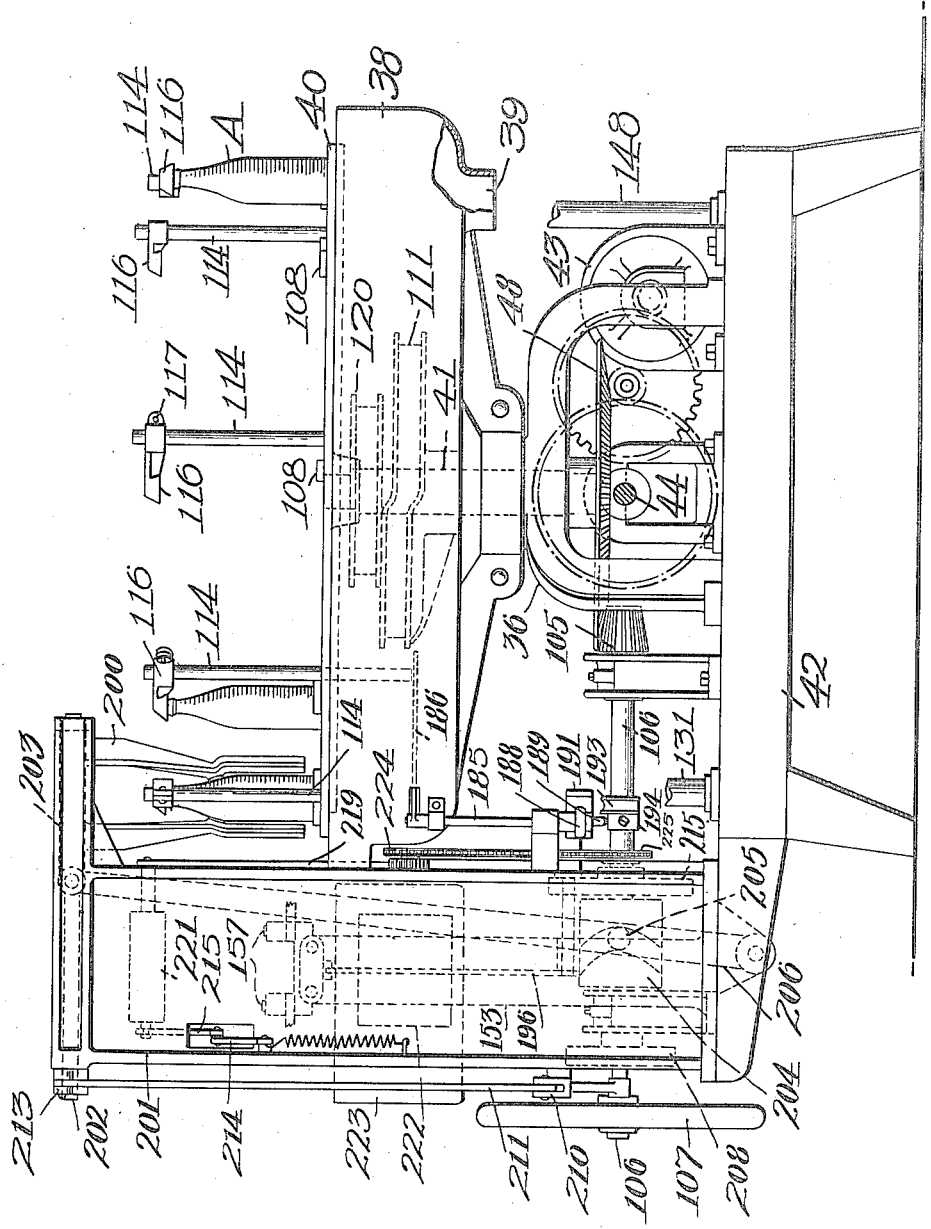

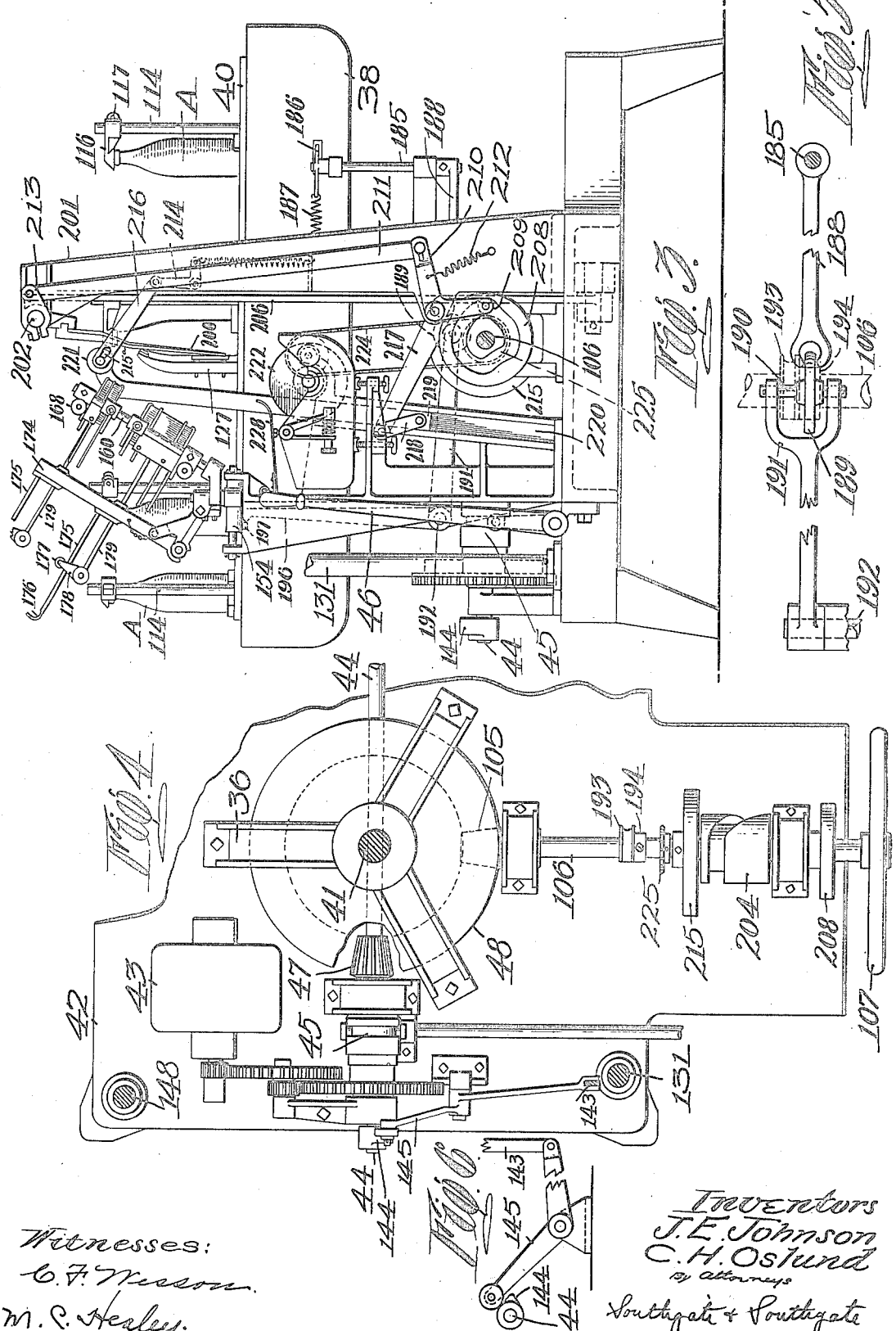

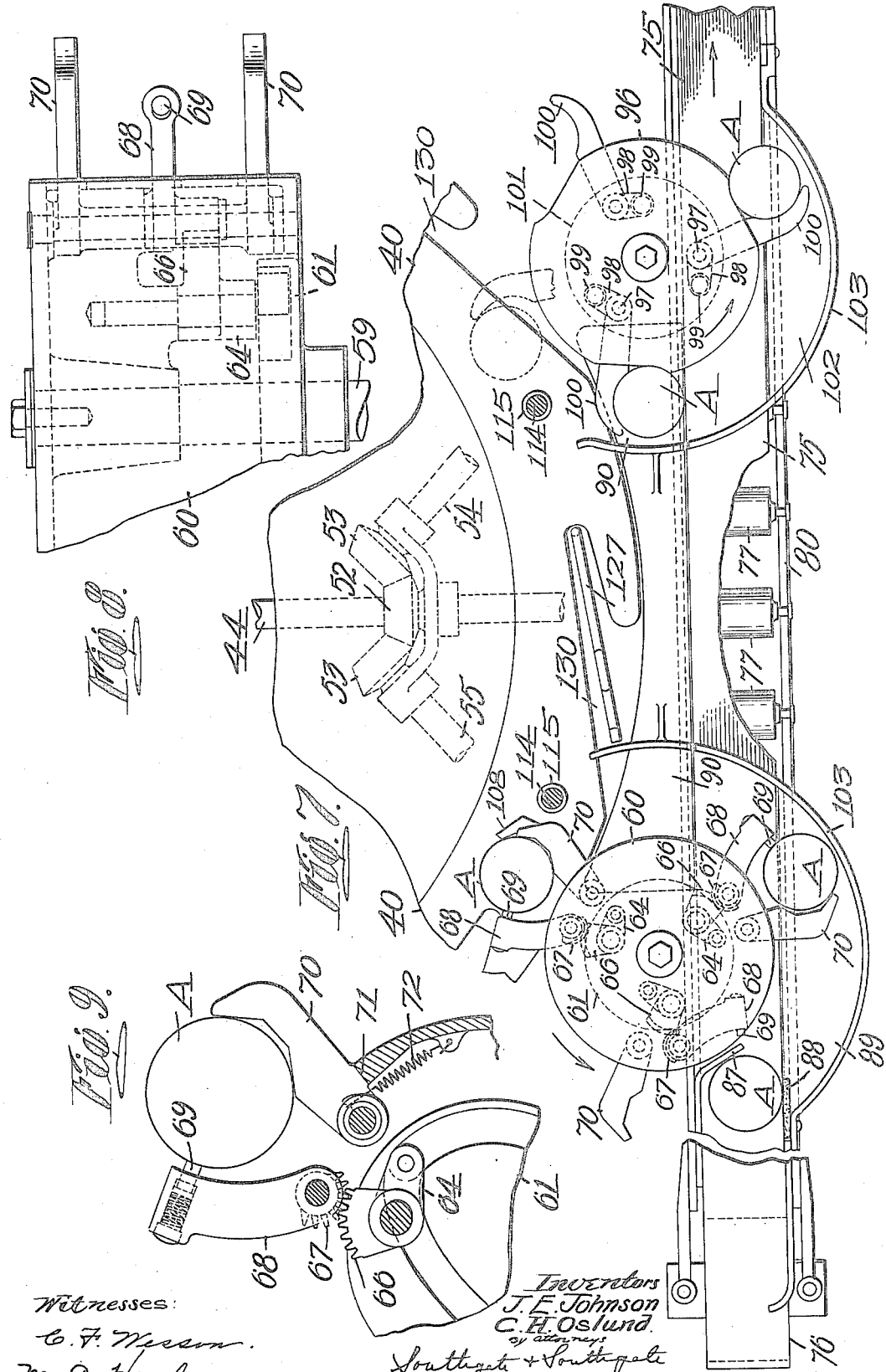

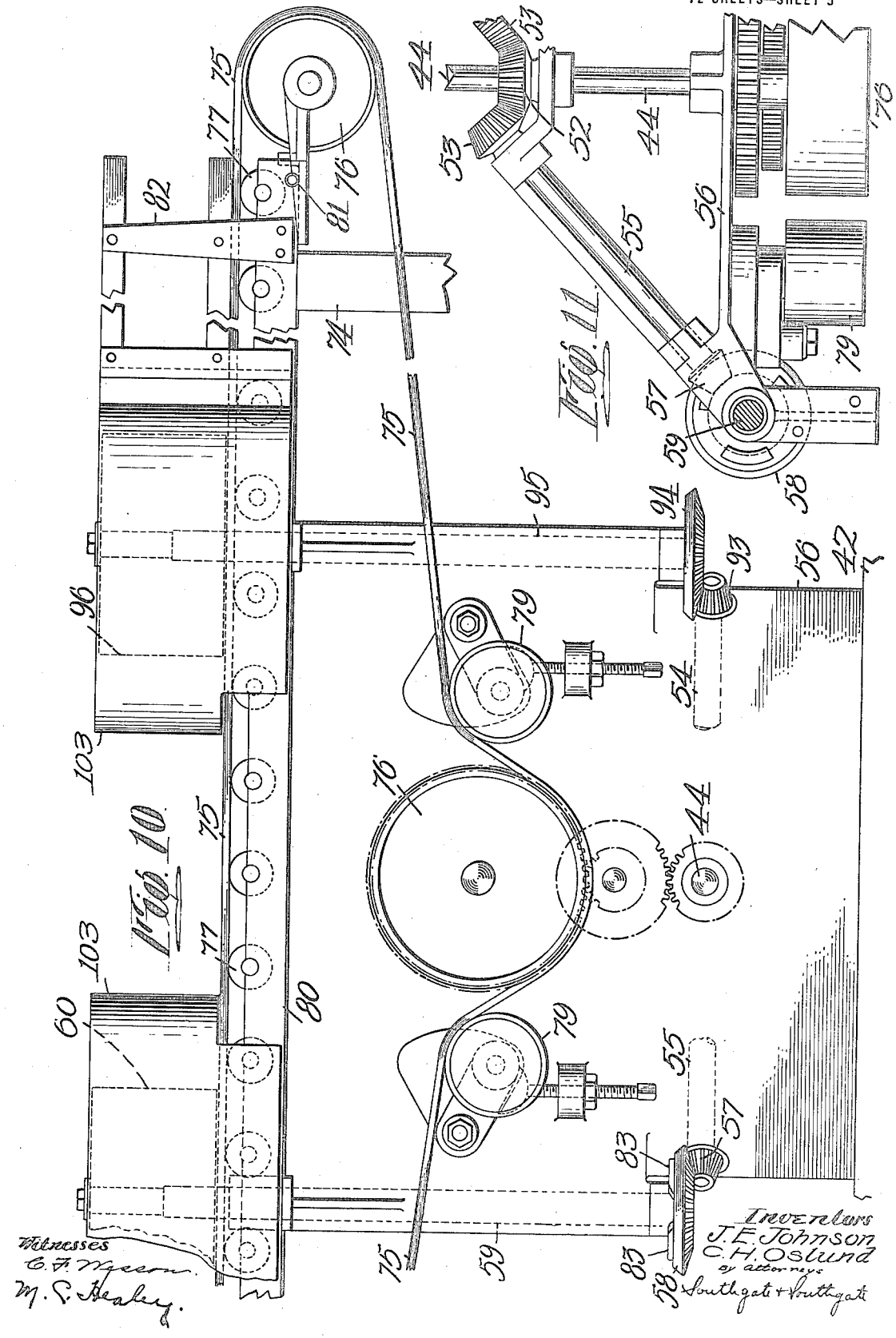

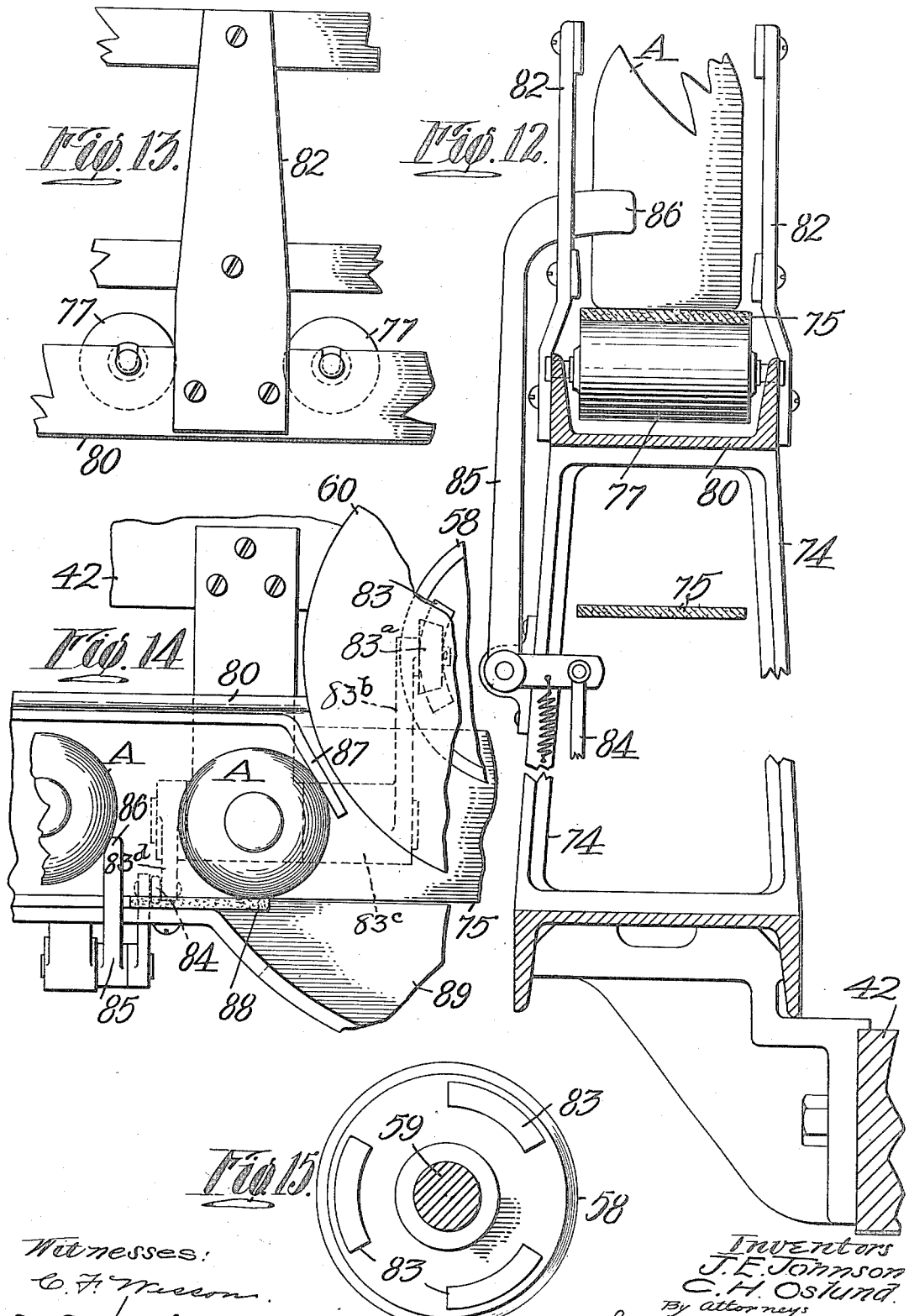

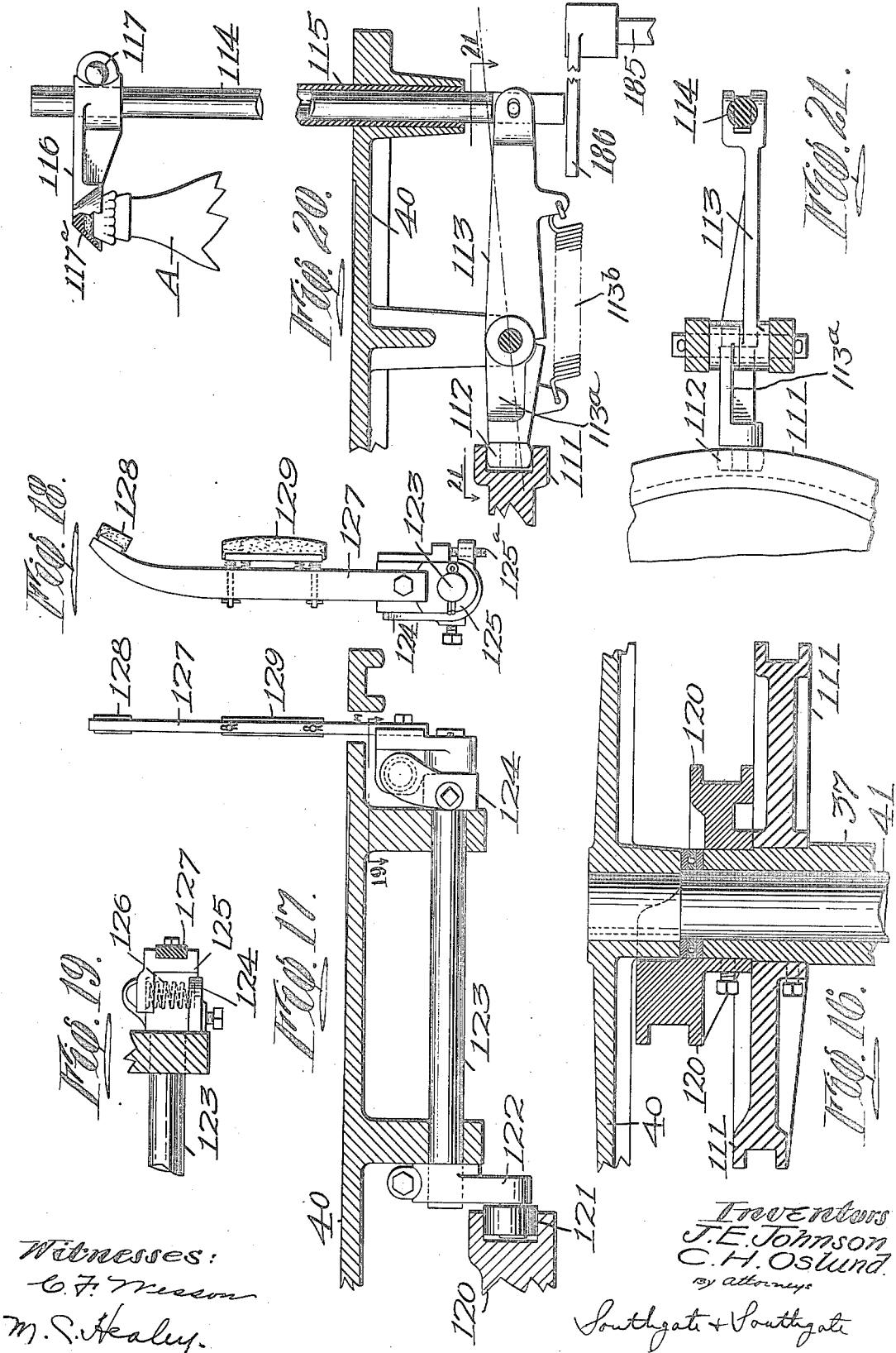

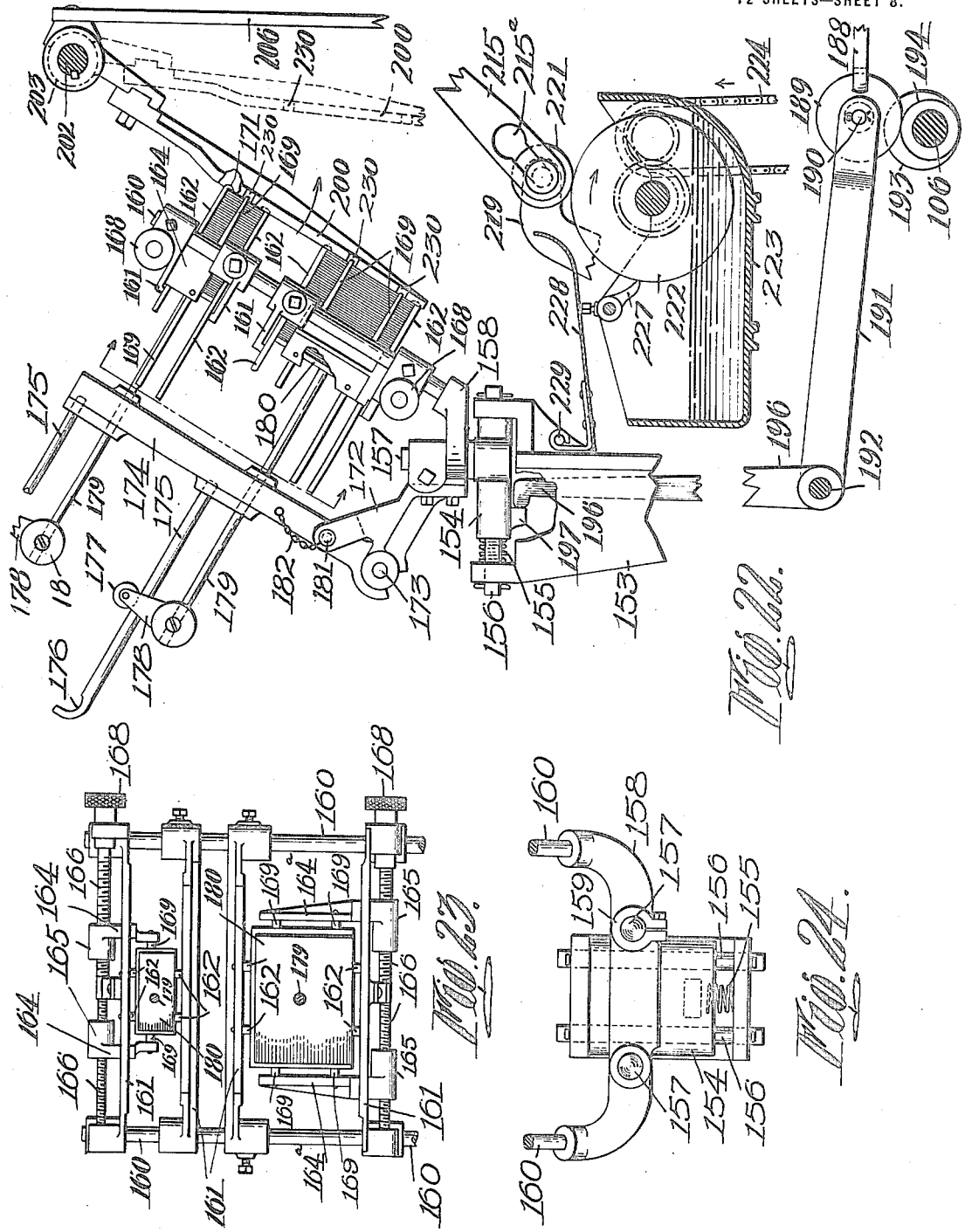

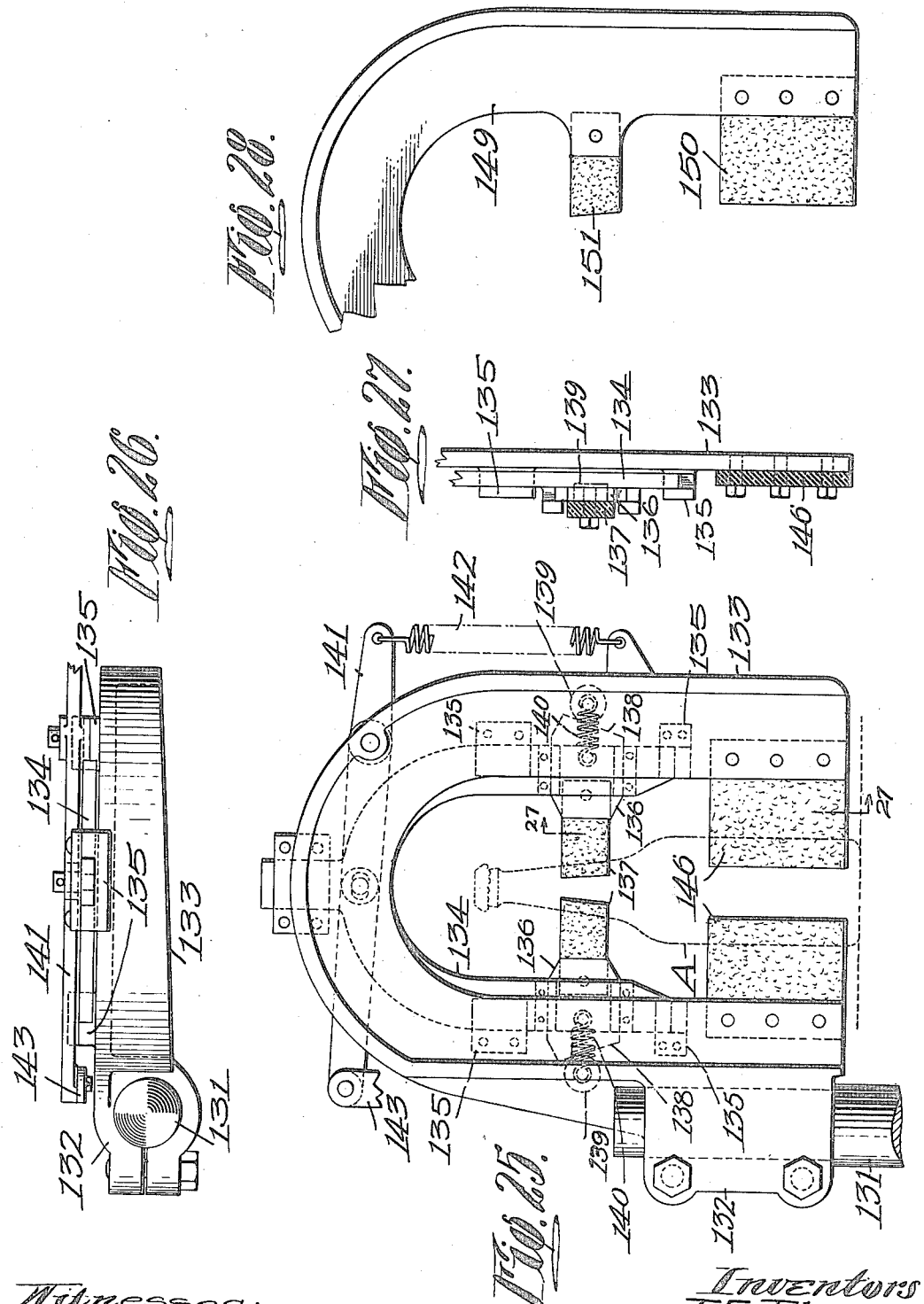

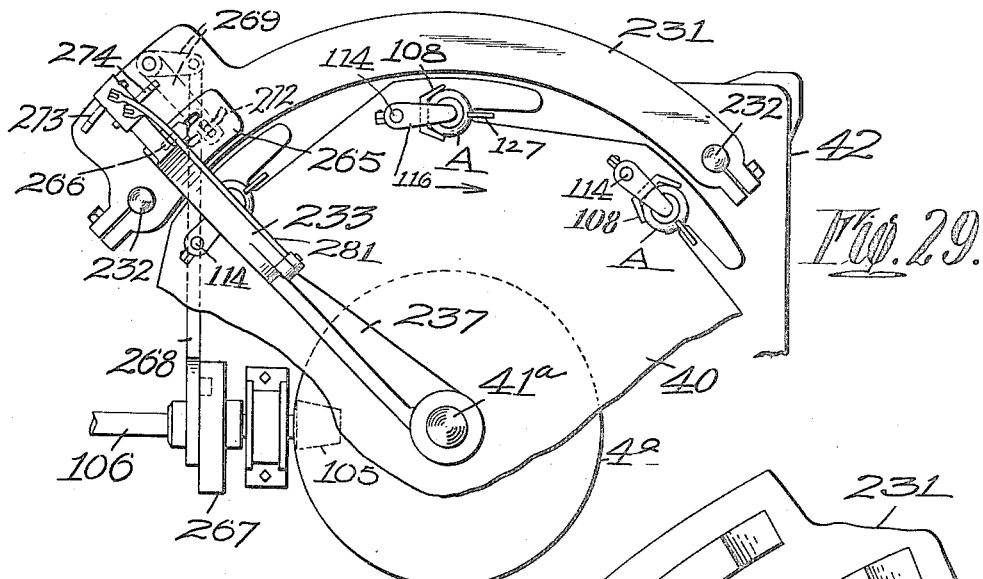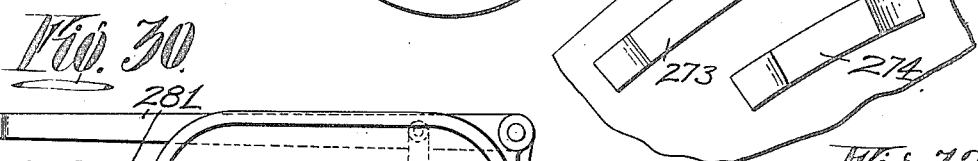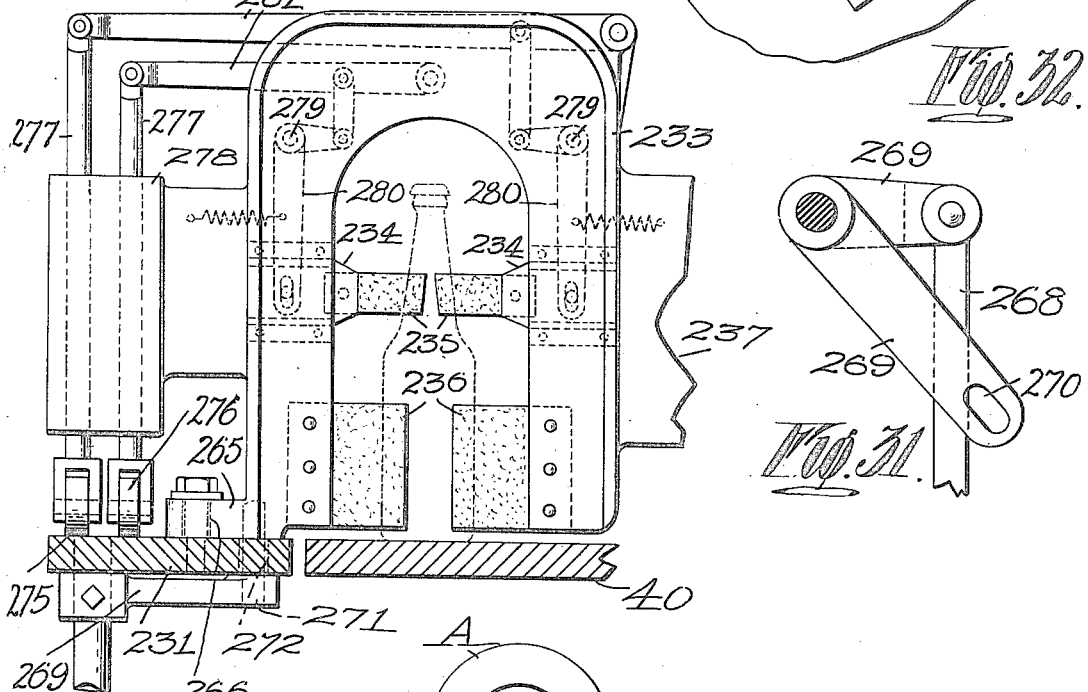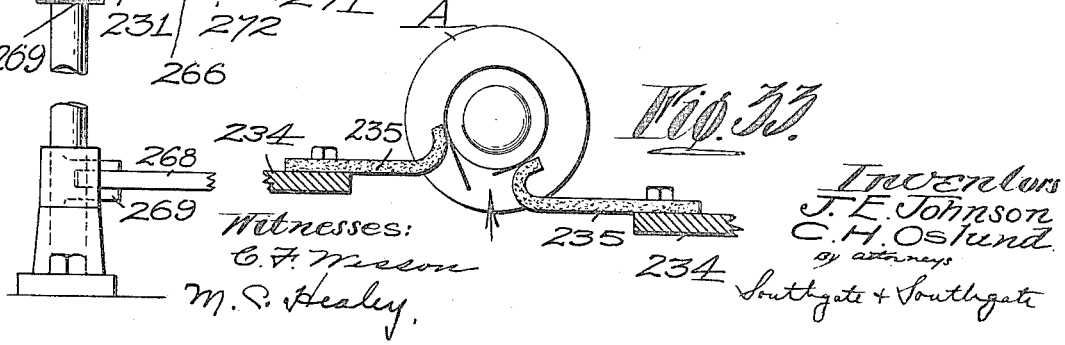

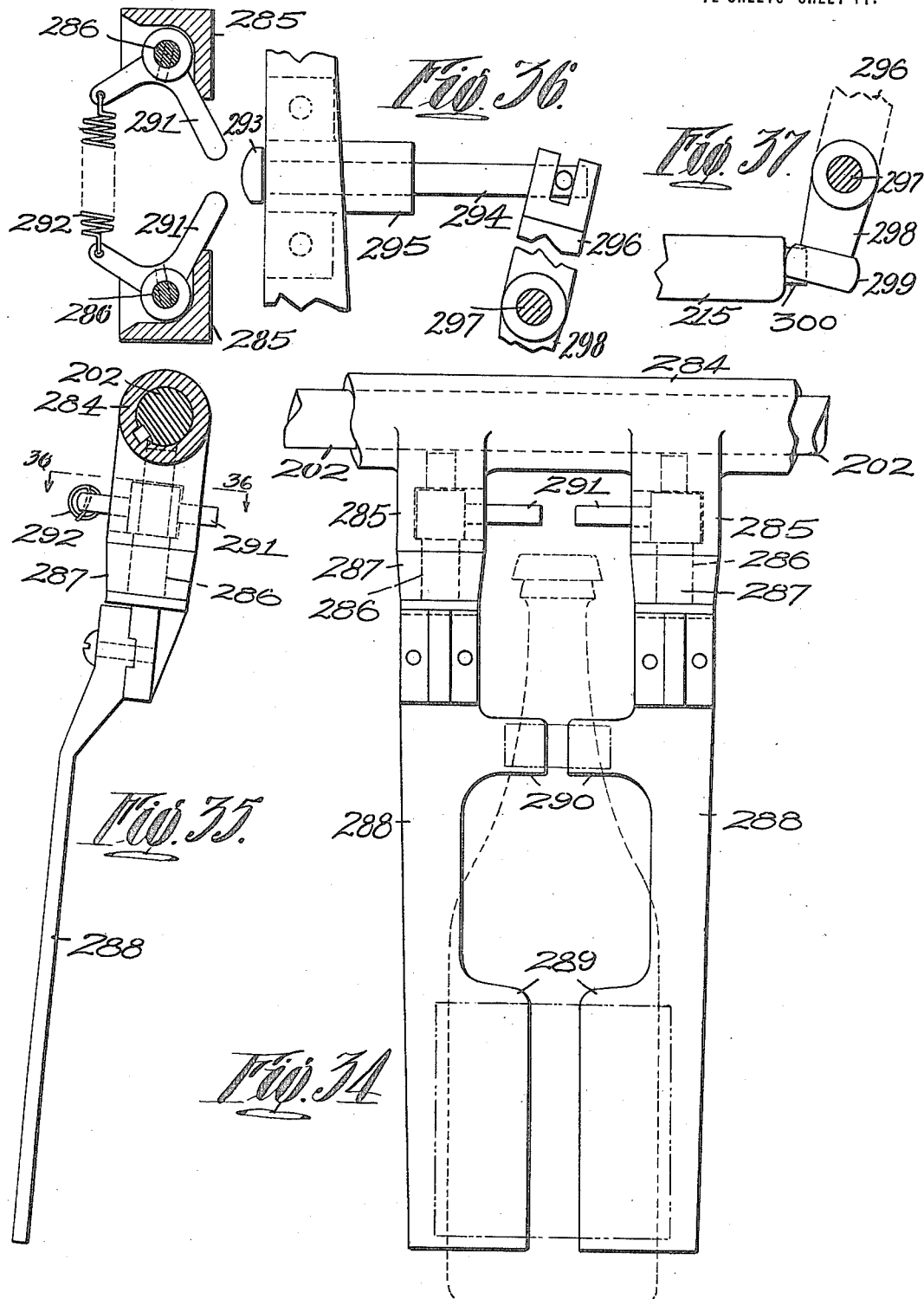

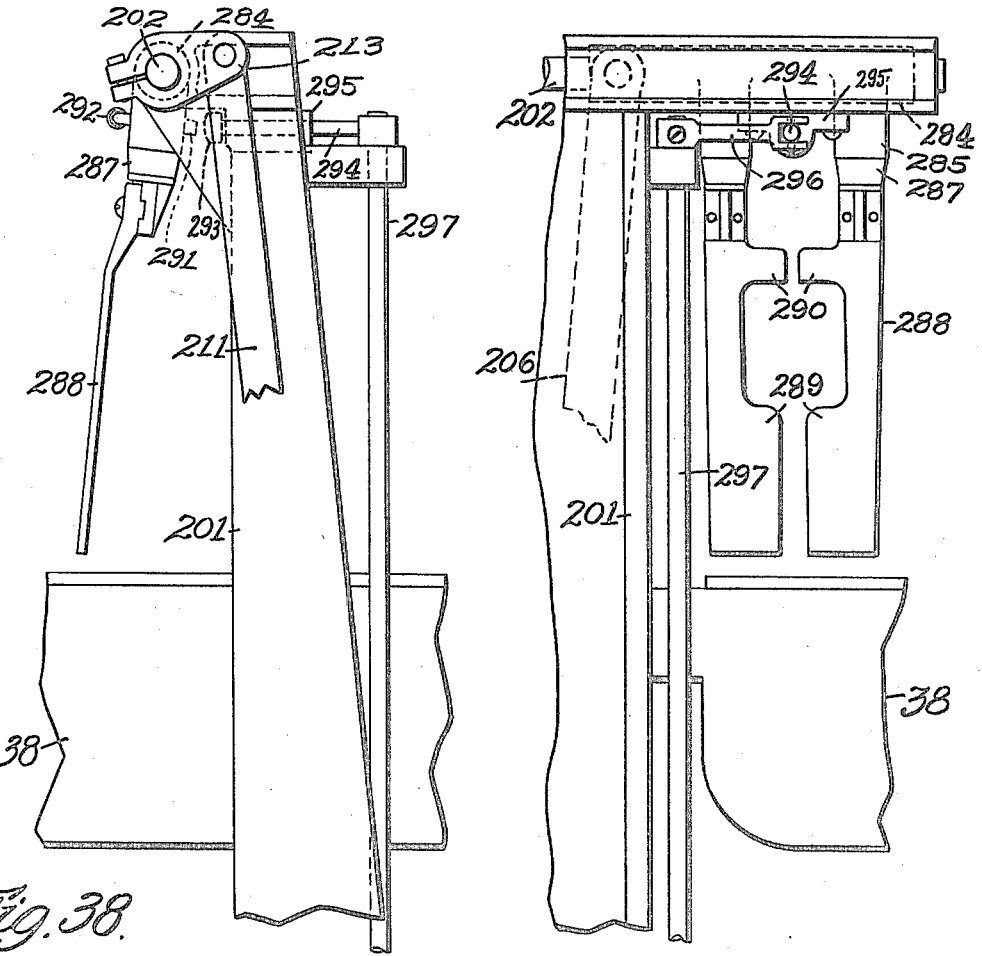
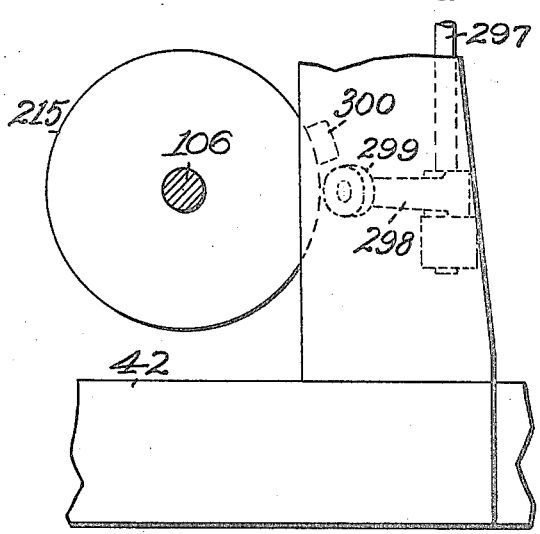
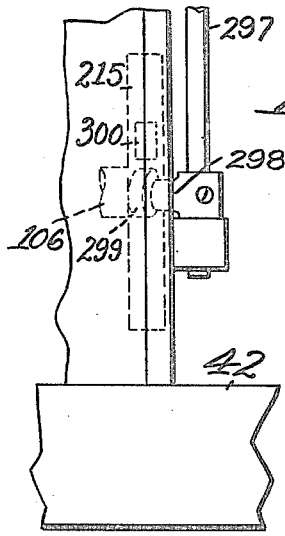

JOHN EMANUEL JOHNSON AND CHARLES H. OSLUND, OF WORCESTER, MASSACHUSETTS.

ROTARY LABELING-MACHINE.

1,238,713.      Specification of Letters Patent.     Patented Aug. 28, 1917.

Application filed June 11, 1914. Serial No. 844,553.

*To all whom it may concern:*

Be it known that we, JOHN EMANUEL JOHNSON and CHARLES H. OSLUND, said JOHNSON being a subject of the King of Sweden, said OSLUND a citizen of the United States, both residing at Worcester, in the county of Worcester and State of Massachusetts, have invented a new and useful Rotary Labeling-Machine, of which the following is a specification.

The principal object of this invention is to provide a machine capable of labeling various articles, but particularly glass bottles, at a very much higher speed than has been possible under conditions heretofore existing. The invention also involves improvements in various features of the machine and particularly in the provision of a rotary table for carrying the bottles around through mechanism for performing the various operations required in applying and affixing the labels, this table being of such a construction that no gears or cams are located above it, and consequently the operators will be protected from injury from such rotating parts. This is particularly advisable on account of the high speed at which the device can operate. The invention also involves improvements in the means for supplying bottles to the labeling machine proper, that is, the rotary table, and taking them therefrom to permit of the operation of the latter at high speed, and improvements in the pasting mechanism by which the labels can be pasted as rapidly as the machine can operate without spattering the paste and without leaving the parts in position when the machine stops to permit of the dropping of the paste at any point outside of the paste-box. This pasting device and label carrier is also constructed in such a manner that the labels are moved edgewise so that they will not move broadside against the air, and thus have a tendency to be detached from the carrier fingers and so that a sudden breeze will not be likely to dislodge them. There are many other improvements in the machine as will appear later.

Reference is to be had to the accompanying drawings, in which—

Figure 1 is a plan of a rotary labeling machine constructed in accordance with this invention;

Fig. 2 is a side elevation of the same with the feed device omitted;

Fig. 3 is an end elevation with the feed device omitted;

Fig. 4 is a plan of the driving mechanism showing the vertical shafts and posts in section, and omitting the stands for supporting the pasting mechanism;

Fig. 5 is a fragmentary plan view of the means for controlling the shifting of the labeling device;

Fig. 6 is an end elevation of a portion of the mechanism for operating the wipers;

Fig. 7 is a plan on enlarged scale of a portion of the feed mechanism;

Fig. 8 is a fragmentary side elevation of the parts thereof;

Fig. 9 is a horizontal section on enlarged scale of a portion of the feed mechanism;

Fig. 10 is a side elevation of the feed mechanism;

Fig. 11 is a plan showing details of the driving means therefor;

Fig. 12 is a sectional view of the feed mechanism on enlarged scale on the line 12—12 of Fig. 1;

Fig. 13 is a fragmentary side elevation thereof;

Fig. 14 is a plan of a portion thereof on enlarged scale;

Fig. 15 is a plan of the cam for operating the feed stop;

Fig. 16 is a vertical central sectional view of a portion of the table and the label grip and bottle grip cams;

Fig. 17 is a radial sectional view on enlarged scale showing the mechanism for operating the label grip;

Fig. 18 is an end elevation of the same;

Fig. 19 is a sectional view on the line 19—19 of Fig. 17;

Fig. 20 is a radial sectional view showing the bottle grip;

Fig. 21 is a horizontal sectional view of the same on the line 21—21 of Fig. 20;

Fig. 22 is a side elevation of the labeling device showing the paste pot in section;

Fig. 23 is an end elevation of the label holder;

Fig. 24 is a plan of a portion thereof;

Fig. 25 is an elevation of the first wipers and coöperating mechanism;

Fig. 26 is a plan thereof;

Fig. 27 is a section on line 27—27 of Fig. 25;

Fig. 28 is an elevation of a second set of wipers;

Fig. 29 is a plan of the table with a modified wiping device;

Fig. 30 is an elevation of the modified wiping device;

Fig. 31 is an enlarged plan of certain connections therefor;

Fig. 32 is a plan showing the cams therefor;

Fig. 33 is a plan showing the wiping action carried out by the mechanism of Figs. 29 to 32;

Fig. 34 is an elevation of a modified label applying device for short labels;

Fig. 35 is an edge view of the same;

Fig. 36 is a sectional view on the line 36—36 of Fig. 35;

Fig. 37 is a similar view showing the cam for operating the pickers;

Fig. 38 is an edge view and Fig. 39 is an elevation of the modified device.

In the form illustrated a main frame 42 is provided on which an electric motor 43 is mounted which by means of gearing operates a horizontal shaft 44 mounted in bearing brackets on the frame. The connection of the motor with the shaft is controlled by a clutch 45 adapted to be thrown in and out by means of a handle 46. On this shaft 44 is a bevel pinion 47 operating a downwardly facing bevel gear 48 fixed to a vertical shaft 41. Consequently when the clutch is connected the motor will constantly rotate the shaft. A spider 36 is carried by the center of the frame 42 and carries a vertical fixed sleeve 37 at the top which supports a main rotary table 40 mounted on the top of the vertical shaft 41 and capable of being turned with this shaft. The table is located in horizontal position and has a horizontal flat surface around its circumference for receiving the bottles. The center of it is raised slightly however to allow liquid to drain off. Under it is a stationary casing 38 having a drain outlet 39.

On the opposite end of the shaft 44 is a bevel pinion 52 meshing with two pinions 53. These are mounted on two horizontal shafts 54 and 55 respectively. These shafts are supported by a vertical stand 56 carried by the frame 42. The shaft 55 through pinion 57 and gear 58 drives a vertical shaft 59 which is provided with a head 60 fixed to the shaft and rotating with it. Arranged about this shaft, but fixed in stationary position on the stand 56 is a face cam 61 having a cam groove for receiving a plurality of rollers, in this instance three. These rollers are mounted on arms 64 which are pivoted on studs carried by the head. To these arms are fixed gear segments 66, each of which is adapted to mesh with a gear segment 67 fixed to another vertical stud also carried by the head.

This gear segment is provided with an arm 68 having a spring pressed plunger 69 thereon. Also carried by the head are an equal number of jaws 70 coöperating with the plunger 69 for the purpose of holding the bottles. The jaws 70 and arms 68 project through slots in the cylindrical wall of the head. Each of these jaws 70 is pivoted on a vertical stud on the head and is adapted to be brought back to a definite position against a rear stop surface 71 by a spring 72. In this way three sets of jaws are provided for taking the bottles from convenient position and placing them on the rotary table. Each set consists, preferably, of two jaws 70 and one plunger 69.

In order to supply the bottles to this feed device an endless conveyer is shown. This comprises a conveyer frame 74 removably fixed to the base 42 and supporting an endless belt 75 running over pulleys 76 and supported by rollers 77 carried by the conveyer frame 74. The belt is provided with tighteners 79 and is operated by gearing from the end of the shaft 44.

The rollers 77 and the other mechanism controlling the feed belt are mounted directly on the edges of a channel iron 80 which is adapted to rest on the frame 74 and constituting part thereof. Consequently the feed device constitutes a mechanism capable of being manufactured and assembled separately from the rest of the machine and having no parts projecting over the labeling machine proper except the parts necessary for carrying the bottles to it and removing them therefrom. This channel is closed at the ends and is provided with a drain outlet 81 to direct any liquid away from the belt. On this channel iron 80 are vertical guides 82 at each side of the feed belt adapted to guide the bottles and necessitate their being placed on the belt in such position that the same will carry them along to the rotary feeding arrangement which has just been described. The guide at the side from which the bottles are applied is discontinued for a certain distance so that the bottles may be placed thereon from that side up against the guide on the other side without any special attention being directed to the position in which they are placed.

For the purpose of insuring the presentation of the bottles one at a time to the rotary head 60 the gear 58 carries a series of cams 83 on the top thereof adapted to engage a roller 83$^a$ on an arm 83$^b$ of a rocker 83$^c$ which carries at its other end an arm 83$^d$ connected by a rod 84 with one arm of a bell-crank 85. The other arm of this bell-crank is provided with a stop 86 and as there are as many cam projections 83 on the gear as there are pairs of jaws on the head 60, and as they are placed in proper position for that operation, the rod 84 will be lifted and the stop 86 withdrawn once for each operation of a pair of feeding jaws. These parts are so timed that this will occur just after a bottle has been fed along by these jaws. For examle, in the position shown in Fig. 1 the stop 86 has just been withdrawn and brought back into place to stop the third bottle shown. To assist the feeding of the bottles a fixed plate 87 is provided projecting out into the guide way over the belt and adjacent to the head 60. Thus, when a bottle A comes up against this projection it is stopped against further motion forward on the belt. However, on account of the angle of this plate 87 it will be forced over to the opposite side of the carrier where it comes against a flexible stop 88 and is held in the position shown in Fig. 7 until positively removed therefrom. When it is engaged by one of the jaws 70 the stop 88 will not offer sufficient resistance to prevent its being moved along around the head. As it is moved by this jaw it moves out on a plate 89 which is at the same level as the belt and forms in fact a stationary platform continuous with the belt and presenting no obstacle to the travel of the bottles. This platform 89 is secured to the side of the channel iron 80. As the bottle is taken around by the head 60 it again passes over the belt and on a platform 90, and from this to the rotary table 40. These parts are all in the same plane.

The removal of the bottles from the rotary table 40 is still simpler. The other bevel pinion 53 is mounted on the shaft 54 which by means of a bevel pinion 93 thereon drives a gear 94 on a vertical shaft 95 on the stand 56. This vertical shaft is provided with a rotary head 96 and on studs 97 carried thereby are pivoted a series of bell cranks, each comprising an arm 98 having a roller 99 thereon and two jaws 100. These jaws project out through slots in the vertical walls of the head. Mounted in fixed position on the stand 56, but centered with respect to the shaft 95, is a grooved cam 101 in which the rollers 99 operate. The jaws 100 therefore come around in time to engage a bottle on the table 40 as that is rotating and the action of the cam is such that the jaw is then quickened in its motion so as to slide the bottle forward faster than the table is moving and move it on the other end of the platform 90, from there over the belt on a fixed platform 102, like the platform 89, and then on the belt which is in the same plane as the platforms 90 and 102 and the table 40. While the bottle is passing on the belt the jaw 100 is retracted so that it will not come in the way of the bottle and so that it will leave the bottle in position on the belt. These parts and also the parts carried by the head 60 are surrounded by casings 103 also acting as guides. The relationship of the motions of the jaws 68, 70 and 100 to the parts carried by the table 40 will be described later in connection with the operation of the entire machine.

For the purpose of operating the pasting mechanism, pickers and bottle holding devices a plurality of times for each revolution of the table, and for the purpose of permitting operation of the whole machine by hand, the gear 48 has meshing with it a bevel pinion 105 mounted on a horizontal shaft 106 underneath. This shaft has on the end of it a hand wheel 107 by which the shaft can be operated, and consequently the gear 48 and table, by hand. This also operates the rest of the mechanism in the same way as if it were operated by the motor, and consequently the operator can stop the motor and adjust the parts of the machine or demonstrate their operation at will.

The bottles, when fed to the flat part of the table in the manner which has been described, are brought in front of a series of lugs or brackets 108 fixed on the table against which the bottles are adapted to be registered just as soon as they reach the table and by which they are positively carried along. The shaft 106 rotates as many times per revolution of the table as there are brackets 108 on the table.

For the purpose of gripping the bottles and positively holding them in position the following mechanism is provided. On the stationary sleeve 37 through which the shaft 41 passes, is a fixed cam 111. Each roll 112 is mounted on one end of an arm 113$^a$ which works in the groove of the cam 111. This arm 113$^a$ and another arm 113 are both pivotally mounted on the under side of the table and have opposing projections at the bottom which are normally in contact, a spring 113$^b$ being used to draw the arms into line by acting on the downwardly projecting lug thereon. So long as the arm 113 is free it moves with the arm 113$^a$. The outer end of the arm 113 is forked and slotted to engage with a pin on a vertically reciprocable rod 114 sliding in a bronze sleeve 115 fixed to the table. The sleeve 115 serves as a guide for the rod 114 and prevents liquid (in case of broken bottles) running down into the mechanism. It will be obvious that by the rise and fall of the roller due to the rise and fall of the groove in this circular cam, the rod 114 will fall and rise a greater distance because the arm 113 is longer than the arm 113$^a$. Mounted on this rod is a bottle grip 116. This can be adjusted by its fastening bolt 117 and it is provided with a conical socket 117$^a$ in the bottom for engaging the top of the bottle and positively clamping it down on the table. The cam is so designed that each bottle is clamped as soon as it is fed to the table. When a bottle is clamped by the grip 116 the fall of the rod 114 and the further turning of the arm 113 are stopped, while the arm 113$^a$ continues to move and the spring 113$^b$ is extended as shown in Fig. 20. If no bottle is clamped the free fall of the rod 114 serves to operate the mechanism through a feeler arm 186 as hereinafter set forth, so as to stop the feed of a label.

Also fixed on the sleeve 37 is a label grip cam 120 which is also circular but rises and falls. This operates a series of cam rollers 121 each on an arm 122 fixed to a rocking shaft 123 radially mounted in bearings projecting down from the bottom of the table. On the other end of this shaft is a collar 124 which is fixed to the shaft by a set screw and has a bearing bushing projecting from its end. On this bushing is loosely mounted a bracket 125. The motion of this bracket is limited by a set screw 125$^a$ on the collar. To this bracket is fixed a label grip arm 127. Bracket 125 is capable of rocking slightly to allow for the variations in the sizes of bottles to be labeled. This rocking is resisted by a spring 126 between the bracket and a projection on the collar. The label grip arm is provided with a pad 128 for gripping the neck label and with a spring-pressed pad 129 for gripping the body label. This yields to allow for variations. In operation it swings up and down through a slot 130 in the table.

Another device which coöperates with the table is a label wiper. This, in the form shown in Figs. 1, 2, and especially in Figs. 25, 26 and 27 embodies means especially constituted for wiping a label on a conical bottle neck or in a similar position. For this purpose the base 42 is provided with a stationary vertical rod 131 and on this is adjustably fixed a bracket 132. This bracket is provided with an arch 133 under which the bottle A is adapted to pass as the table 40 rotates. On this arch is mounted a U-shaped support or slide 134 having guides at 135 on the arch. Transversely slidable on the two arms of this slide are a pair of slides 136 each carrying rubber wipers 137. Each of these slides is provided with a cam face 138 shown as having a straight inclination at the end for engaging a pair of stationary rolls 139 on the arch. Springs 140 are provided for holding these cam faces in contact with these rolls. The slide 134 is adapted to reciprocate vertically by means to be described and during that reciprocation the cam faces 138 engage the rolls 139 and are forced inwardly. Consequently the wipers 137 simultaneously move inwardly and downwardly which produces a motion toward each other on an inclination.

The means for operating the slide 134 is shown in the form of a lever 141 provided with a spring 142 for moving it in one direction and a rod 143 operated by a cam 144 on the shaft 44 for moving it in the other direction so that it is positively moved down. The motion is transmitted through a lever 145 pivoted on a bracket on the base 42. The arch 133 is provided with a pair of stationary rubber wipers 146, the operation of which will be obvious.

Located at the next corner of the frame 42 is another stationary base or column 148 which carries a fixed arch 149 provided with a pair of fixed wipers 150 for the body labels and another pair 151 for the neck labels having an inclined operative end. This is for the purpose of slicking the labels and taking care of any inaccuracy or displacement which may have occurred in the first wiping operation.

The paste and label carrying mechanism is controlled from the shaft 106. The frame 42 is provided with a stand 153 extending upwardly therefrom on which the label holder is mounted. On the top of this stand is a horizontally movable support 154 held by a spring 155 in its forward operative position but capable of moving back on guide rods 156 to an inoperative position. It carries upon it a pair of vertical studs 157 on which a bracket 158 is mounted. One of the bosses 159 on this bracket which surrounds one of the studs 157 is split and its ends connected by a bolt or screw so that it can be fixed in position and so that the bracket 158 can be adjusted vertically and fixed in adjusted position. Projecting upwardly at an angle from the bracket 158 are a pair of parallel rods 160. Between these rods are a series of cross bars 161, four being shown in the drawings. They are fixed in any adjustable position on the rods 160 by means of set screws or the like so as to be adjusted for labels of any desired width. Each of these cross bars carries a pair of guides 162 which constitute one side of a label holder. They are also provided with longitudinal perforations through which project arms 164 and 164$^a$ carried by hubs 165 mounted on right and left-hand screws 166. These screws are supported in projections from the ends of the top and bottom cross bars and have hand wheels 168 by which they can be turned to adjust the arms 164 back and forth. Each arm 164 and 164$^a$ supports one or more guides 169 which constitute the ends of the label holder.

It will be seen that by the use of the number of parts shown in the drawings, two label holders can be provided, one for the body labels and the other for the neck labels, Each of the guide bars 162 and 169 has a hook 171 on the end. These hooks face inwardly to hold the labels but do not project far over the edges so that the labels can be withdrawn from the end of each label holder.

The bracket 158 is provided with a rearward extension 172 carrying a pivot shaft 173 on which is pivotally mounted a plate 174. This is provided with a pair of guide rods 175 each having a depression 176 in the end at the top. These guide rods support rollers 177 which carry arms 178 having fixed relatively thereto rods 179 guided through slots in the plate 174 and provided on their ends with plates 180 adapted to engage the end label in each label holder and hold the labels in proper position against the hooks 171. The arms 178 and rod 179 are connected by members 180 which constitute weights for holding the rods 179 down toward the hoppers and keeping labels in proper position. The depressions 176 are for the engagement of the rolls 177 when it is desired to draw the plates 180 back to permit filling the holders or adjusting the parts. Moreover, the whole plate 174 can be swung back after the rolls 177 are brought into the depressions 176 so as to provide ready access to the label holders. The plate 174 is held in the position shown in Fig. 22 by a pin 181 passing through holes in the plate and in an arm on the bracket 172. A chain 182 is shown for preventing this pin being lost when the plate 174 is turned back.

In order to prevent the operation of the labeling device whenever the table revolves into position for receiving a label without a bottle A being in position, the following mechanism is provided. Mounted on a vertical fixed shaft 185 is a bell crank having a feeler arm 186 adapted to be engaged by the bottom of the rod 114 when the same moved along with the table if no bottle is in position. But if a bottle is in place the rod is held up out of the way of the bell crank. Normally when a bottle is in position, the rod 114 passes over this arm. But if no bottle is present the arm is pushed out by the rod toward the edge of the table and the other arm of the bell crank is moved so as to extend the spring 187 which is connected to it. The turning of the bell crank also turns the shaft 185 to which it is fixed and swings an arm 188 mounted thereon to the position shown in Fig. 5. This arm has a fork at the end engaging a roller 189 loosely mounted on a shaft 190 and moves the roller along said shaft between the arms of a fork 191 which supports the shaft. This fork is fixed on a shaft 192 and the roller 189 is adapted to rest on a feeler cam 193 on the shaft 106 when in one position and on a circular hub 194 when in the other position. Consequently it will be seen that whether this roll is moved up and down by the cam depends upon the position of the arm 188, and that is controlled by the feeler arm 186.

Ordinarily the roll is located on the collar 194 and does not move up, but when the parts move around to the position shown in Fig. 1 and no bottle is in position the feeler arm moves out and the roll 189 moves over on the cam and is then raised upon that rotation of the shaft 106. That is, it is raised at a certain definite time in this rotation. The result of this is to lift the roll 189 and turn the shaft 192, thus swinging an arm 196 fixed on this shaft. This engages a lug 197 on the slide 154 and moves the same back against the spring 155. This moves the whole labeling holding device back out of the reach of the pickers 200.

The support 42 is provided with a stand 201 on which is a rod 202. On this rod is a slidable sleeve 203, the sleeve being keyed to turn with the rod. To this sleeve the label pickers 200 are fixed so as to move with it from the full line to the dotted line position in Fig. 22. The sleeve also slides along the rod to move the picker from the label holder to a position to apply the labels to the bottles. For the purpose of causing these motions the following mechanism is provided.

On the shaft 106 is a picker sliding edge cam 204 and the groove of this cam engages a cam roll 205 which is on a lever 206. This lever is pivoted below the bottom of the frame 42 and is pivotally connected with the sliding sleeve 203 by means of a grooved collar thereon. It will be obvious therefore that as the shaft rotates this sleeve is reciprocated in a certain definite way.

Also mounted on the shaft 106 is a picker swinging face cam 208. This operates a roll 209 mounted on a bell crank 210 which is connected at its outer end with a link 211 which is normally pulled down by a spring 212. This link is connected at its upper end with an arm 213 fixed to the rod 202 and consequently it will be clear that when the cam 208 pulls the roll 209 in the pickers will be rocked toward the label holder.

The shaft 106 is provided also with a roll cam 215 which operates a roller on a lever 217 which is connected by a link 218 with a slide 219 operating in an upwardly inclined guide 220. This slide is provided with a paste roller 221 on the top. The operation of this slide causes the paste roller to move up and down on an inclination for the purpose of applying paste to the pickers when they are in the dotted line position in Fig. 22.

In order to keep the paste roller 221 firmly in contact with both pickers throughout its travel so that the paste will be applied uniformly, the following mechanism is shown. A bell crank 214 is pivoted on the stand 201 and held down at one end by a strong spring. To the other arm of the bell crank is pivoted a link 216 having a longitudinal slot 215ᵃ enlarged at its inner end. This receives the grooved end of the shaft of the paste roller 221, and the spring always holds this end of the roller against its picker. The enlargement of the groove is to permit easy disassembling of the parts.

The roller gets its paste from the paste drum 222 mounted in the paste pot 223 and operated by a sprocket chain 224 from a sprocket wheel 225 on the shaft 106. A scraper 227 is mounted in the paste-pot to engage the drum and remove superfluous paste therefrom in such a manner as to cause it to run back into the paste-pot. The upper part of the paste-pot is closed by a plate 228 pivoted on studs 229 and capable of swinging up into inclined position. In all positions of this cover any paste that is on it will drip back into the pot. It is to be observed, also, that no matter where the pickers stop any paste on them will drop back into the pot or on the cover unless they are stopped when they are over or partly over the table, when of course they have no loose paste on them.

The sequence of operations secured by the various cams and driving mechanisms shown is as follows: The rollers 221 rise from the paste drum 222, the pickers 200 then move outwardly from the table to the dotted line position shown in Fig. 22. The roller 221 then moves downwardly and applies paste to the forward surface of the picker. It then moves back into engagement with the drum. Its movement is in a plane parallel with the plane of the pickers when in their retracted position shown in dotted lines in Fig. 22. Then the cam 208 acts to swing the pickers up into the full line position shown in Fig. 22 where they engage the labels at that end of the label holder. The pickers are provided with notches 230 in their edges for enabling them to pass the hooks 171. The pickers being covered with paste and engaging the labels near their outer edges draw the two end labels from the label holders and the motion of the holders is a compound one, that is, the cam 208 is drawing the pickers back to the dotted line position in Fig. 22 and at the same time the cam 204 is acting to move the pickers longitudinally with the slide 203. The action of the cam 208 is completed and ceases before the pickers pass over the table so that their entire motion over the table at this point is in the plane of the labels held thereby, and at this time they come out in the position shown in Fig. 1, but before the bottle reaches the position there shown, the pickers are in a vertical position, holding the labels in readiness to be engaged by the bottle A as it comes around on the table. The result of this is that the bottle passes between the two pickers and takes the labels from them. The pickers move backward and thereafter in their own plane to their first position under the action of the cams 208 and 204. This brings them back to the dotted line position shown in Fig. 22 and the cycle of operations is repeated.

It will be understood of course, that as soon as the labels are applied to the bottle by the motion of the bottle itself between the pickers, the cam 120 causes the label gripper 127 to swing upwardly into the position shown at the left in Fig. 1 and engage the labels. This then, of course, moves around with the bottle and positively holds the labels in position until the wipers engage it and smooth it out on the surface of the bottle. Various positions of the label grip are shown in Fig. 1.

Although we have described the operations of several of the parts while describing the constructions, we will now describe the operation of the machine as a whole.

The motor 43 being in operation the operator is at liberty to manipulate the starting lever 46 to throw in the clutch 45 and start the shafts 41, 44 and 106. This results in the first place in rotating the table at a rapid but uniform speed. Bottles A are placed by hand or in any other desired way upon the feed belt 75 at the left in Fig. 1 and as they move up toward the feeding device 60 the stop 86 is operated automatically to allow one bottle at a time to be engaged by this feeding device. This feeding device as it rotates engages a bottle supported by the belt and located between the parts 87 and 88 and positively moves it around through more than a half circle as has been described already. This operation is performed positively by the jaws 70, but the bottle is also engaged by the spring-pressed plunger 69 on the other jaw. The bottle is applied in this manner to the rotating table which rotates at a higher speed in feet per minute than the jaws 70. Consequently the bottle will be carried along by the table. The stud 114 moves around with the table and consequently if it engages the surface of the jaw 70 it will only swing it in opposition to the spring 72 and do no damage. From this point the bottle which has just been gripped by the bottle grip 116 moves along positively with the table. Just before it gets to the pickers they slide in a vertical plane in front of it so that one picker is on each side of the bottle. Then the bottle passes between the pickers and takes the labels from them by this means. The label gripper rises at this time and grips the two labels on the bottle. When the bottle and stud 114 pass beyond the pickers they slide back toward the pasting device ready for another operation. The bottle with the labels thereon and the label holder positively holding them move on between the wipers of the first set and their relative positions are unchanged as they move on between the second set of wipers if that is used. It can be dispensed with on some kinds of work. The bottle then passes along to a position about opposite that at which the pickers supply the label to it and there the label holder is caused by its cam to slide out of the way. The next step forward permits the bottle to be unclamped and then engaged by one of the jaws 100 and moved off the table in the manner which has previously been described.

Although the form of wipers already described herein is practical and satisfactory, we have shown on the tenth sheet of drawings a modified form particularly adapted for use in applying labels which entirely surround the neck or body thereof. In this case the table 40 is arranged as above but the vertical shaft 41ª extends up through the top of the table and is provided with a radial arm 237 which is loose on the shaft and extends out over a fixed stand 231 carried by uprights 232 on the frame 42. The end of the arm supports an arch 233 which carries horizontal reciprocable slides 234 on which are mounted wipers 235 for the bottle neck. The bottom of the arch carries wipers 236 fixed thereon for the body label. The arch is provided with a toe 265 which has a circumferential slot 266 through which a bolt passes into the stand 231. This allows a vibratory motion in a plane parallel with the plane of the table. This motion is provided by a cam 267 on the shaft 106. This operates a link 268 and a lever 269, one arm of which is provided with a slot 270 through which passes a pin 271. This pin passes downwardly through a slot 272 in the stand 231 from the bottom of the toe 265 which supports it. In this way the arch is vibrated and the parts are so designed that it moves forward in the direction in which the table moves at the time when the table carries a bottle through the arch. This motion of the arch is slower than that of the table and is designed for getting a longer contact of the wipers with the bottle than would be the case if the arch were stationary. It is also provided in order that the following motions may take place. On the stationary stand 231 are a pair of cams 273 and 274 with which a pair of rollers 275 and 276 are adapted to engage. These rollers are mounted at the bottom of vertically mounted rods 277 which are guided in a guide member 278 carried by the arch. The rise of these rollers when they engage the cams causes a pair of levers 281 to swing upwardly about their pivots on the arch and to turn on a pair of shafts 279 and thus move inwardly the lower ends of arms 280 on these shafts and force the slides 234 inwardly. It is to be observed, however, that the motions of the two slides are not exactly the same. The two cams are located differently and the lengths of the levers 281 are different. The purpose of this is to provide for pasting a label entirely around the bottle. This is accomplished by causing the right hand slide 234 to move inwardly first and complete its wiping operation as indicated in Fig. 33. The left-hand slide moves in later and pastes that end of the label over the end of the label operated upon by the other slide and thus the entire circumference of the bottle and its label is operated upon by the two wipers. The mechanism is shown as arranged for wiping a neck label that entirely surrounds the neck, but the body label wipers are shown as operating upon a label which does not entirely surround the bottle so that both wipers can operate on each simultaneously and equally on both sides.

On the last two sheets of drawings is shown a modified form of picking device designed for use with short labels which necessitate the pickers coming closer together than the thickness of the bottle, thus preventing the latter passing between the pickers. It can also be used in cases where it is desired to place paste over so much surface of the labels that the pickers also come too close together. In this case the shaft 202 is provided with a sleeve 284 which works in the same way as the sleeve 203 and it is provided with a pair of bottom projections 285 for receiving the ends of a pair of shafts 286. These shafts are swiveled in the projections 285 so as to turn therein and each is provided with a hub 287 fixed thereon beyond the projection so that the shafts may turn on their own axes. To each shaft is fixed a picker 288 which, in the form shown in these figures, projects inwardly at 289 and 290 so that paste may be applied nearer the center of the label than in the cases heretofore described.

For the purpose of turning the shafts and pickers on the axes of the shafts, each shaft is provided with a bell-crank 291, these being connected by a spring 292. The opposite arms of the bell-cranks are designed to be engaged by a head 293 on a slide 294 for the purpose of swinging these shafts on their axes and turning the pickers forward and oppositely out of the way of the advancing bottle. For the purpose of doing this the slide is mounted in a guide 295 and is designed to be operated by an arm 296 on a vertical shaft 297, the other end of the shaft being provided with an arm 298 having a roller 299 adapted to be engaged by a projection 300 on the cam 215. This projection is so proportioned and located that after the pickers have come in front of the bottle, in the way described in connection with the other figures and the bottle is moved up into position to pass between them, the two pickers will swing outwardly and just allow the bottle to pass between.

Although we have illustrated and described only a few modifications of the several features of this invention, we are aware of the fact that many other modifications can be made therein without departing from the scope of the invention as expressed in the claims. Therefore we do not wish to be limited to all the details of construction herein shown and described but what we do claim is:—

1. In a labeling machine, the combination with a movable carrier having a substantially horizontal surface on which the articles to be labeled are supported, and means for applying a label to an article on the carrier, of a series of clamping devices movable above the carrier for engaging the top of an article and clamping it to the surface of the carrier, and means movable with the carrier and extending down through it for operating said clamping devices as the carrier moves.

2. In a labeling machine, the combination with a horizontal rotary table for supporting the articles to be labeled, gage plates on said table against which the articles are adapted to engage, a series of rods vertically slidable through the table, each having a clamping device thereon for engaging the top of the article to be labeled, means whereby said rods and clamping devices are moved vertically as the table rotates, and means for applying labels to the articles supported on said table.

3. In a labeling machine, the combination with a horizontal rotary table for supporting the articles to be labeled, a series of rods vertically slidable through the table, each having a clamping device thereon for engaging the top of the article to be labeled, means located under the table for moving said rods and clamping devices vertically as the table rotates, and means for applying labels to the articles supported on said table.

4. In a labeling machine, the combination with a horizontal rotary table for supporting the articles to be labeled having holes therethrough, a sleeve in each hole to prevent the passage of liquid therethrough, a series of rods vertically slidable through the sleeves, each having a clamping device thereon for engaging the top of the article to be labeled, means located under the table for moving said rods and clamping devices vertically as the table rotates, and means for applying labels to the articles supported on said table.

5. In a labeling machine, the combination with a horizontal rotary table for supporting the articles to be labeled, a series of rods vertically slidable through, and carried by, the table each having a clamping device thereon for engaging the top of the article to be labeled, a stationary cam below the table, radial levers supported on the under side of the table for engaging said cam and operating the rods periodically as the table rotates, and means for applying labels to the articles supported on said table.

6. In a labeling machine, the combination, with a horizontal rotary table, of a fixed cam under the table, a lever supported by the table and connected with the cam to be operated thereby, a rod reciprocable vertically through the table and supported thereby and connected with the shaft, yielding means for holding the rod down, a downwardly facing bottle clamp adjustably mounted on said rod and movable therewith, and means for applying labels to the articles supported on said table.

7. In a labeling machine, the combination of a table rotatable on a vertical axis and adapted to support on its upper surface the articles to be labeled, of means carried by the table for clamping against the table the articles to be labeled, means carried by the table for gripping a label on each article to be labeled, and means located under the table for operating said article clamping and label gripping means.

8. In a labeling machine, the combination with a horizontal rotary table for supporting the articles to be labeled, of a stationary cam under the table, means supported by the table underneath it and operated by said cam as the table rotates for clamping the articles to be labeled down on the table and unclamping them periodically, a series of label gripping devices, and means for moving said label gripping devices into contact with the article to be labeled.

9. In a labeling machine, the combination with a movable carrier for supporting the articles to be labeled, and means movable with the carrier for clamping down the top of the articles to be labeled and unclamping them periodically, a series of label gripping devices, and means for moving said label gripping devices into contact with the article to be labeled while held by the clamping means.

10. In a labeling machine, the combination with a horizontal rotary table for supporting the articles to be labeled, of means for engaging the tops of and clamping the articles to be labeled and unclamping them periodically, a series of label gripping devices, and means located under the table for moving said label gripping devices into contact with the article to be labeled while held by the clamping means.

11. In a labeling machine, the combination of a vertical shaft, means for rotating said shaft, a horizontal table mounted on and rotatable with said shaft, a pair of stationary cams surrounding said shaft under the table, two sets of levers mounted on the under side of the table and rotatable therewith, means for operating the levers of each set from one of the cams, vertically reciprocable means supported by the table and operated by one set of levers for clamping an article to be labeled on the top of a table, and means supported by the table and movable from a substantially horizontal to a substantially vertical position and controlled by the other set of levers for gripping labels on the articles while held by said clamping means.

12. In a labeling machine, the combination with a movable carrier for supporting the articles to be labeled, a series of rods carried by and slidable through the carrier but located on one side thereof and each having a clamping device thereon for engaging the end of an article to be labeled and forcing it normally against the surface of the carrier, means located on the other side of the carrier for operating said rods periodically as the carrier operates, and means for applying labels to the articles held by said clamping device.

13. In a labeling machine, the combination with a rotary table for supporting articles to be labeled, of a fixed cam substantially concentric with the table, a radial shaft carried by the table and having an arm thereon provided with means for being turned by said cam as the table rotates, a label grip finger projecting from said shaft at right angles thereto, a bracket on the shaft for supporting said grip finger, yielding means for connecting said bracket with the shaft, said table having a slot therethrough through which the grip finger is adapted to move.

14. In a labeling machine, the combination of a movable carrier for supporting the articles to be labeled, a fixed cam under the carrier, a shaft carried by the carrier, means connected with the shaft by which the shaft is oscillated by the cam as the carrier moves, a grip finger extending at right angles to said shaft, a label grip pad fixed to said grip finger, and a second label pad yieldingly mounted on the grip finger.

15. In a labeling machine, the combination of a table rotatable on a vertical axis and adapted to support on its upper surface the articles to be labeled, of means carried on the table for clamping an article on the upper surface thereof, means carried by the table for gripping a label on each article, means supported independently of the table and located over it for wiping the label on said article, and means located under the table for operating said article clamping, label gripping and wiping means.

16. In a labeling machine, the combination of a table rotatable on a vertical axis and adapted to support on its upper surface the articles to be labeled, means carried by the table for gripping a label on each article, means supported independently of the table and located over it for wiping the label on said article, and means located under the table for operating said label gripping means vertically and said wiping means horizontally.

17. In a labeling machine, the combination of a table rotatable on a vertical axis and adapted to support articles to be labeled on its upper surface, of means carried on the table for clamping an article on the upper surface thereof, means supported independently of the table and located over it for wiping the label on said article, and means located under the table for operating said article clamping and wiping means.

18. In a labeling machine, the combination with a carrier for the articles to be labeled, of a support located over the carrier, a pair of wipers movably mounted on the support opposite each other, and means for simultaneously moving said support down and said wipers toward each other.

19. In a labeling machine, the combination, of an arch, a support slidable vertically on the arch, a pair of wipers movably mounted on the support opposite each other, a pair of rolls on said arch, and cam faces on each wiper for engaging said rolls as the support moves down for forcing the wipers inwardly.

20. In a labeling machine, the combination of a pair of wipers adapted to engage the opposite sides of an article to be labeled, one of said wipers being located in a plane nearer the article to be labeled than the other, and means for moving one wiper inward toward the center of the article to the end of its stroke and for thereafter moving the other wiper inward to the end of its stroke.

21. In a labeling machine, the combination of a pair of independently movable wipers, one located forward of the other in parallel planes, and means for moving the rear wiper inwardly to the end of its stroke before the other wiper has completed its stroke and thereafter moving the other one inwardly to the end of its stroke, whereby a label can be wiped entirely around a circular article.

22. In a labeling machine, the combination of a pair of wipers located substantially opposite each other and projecting toward each other and arranged in different planes, whereby the position of one of the wipers is nearer the article to be acted on than the other at the completion of the wiping operation, and means for moving the more remote wiper forward to the end of its stroke and for thereafter moving the other wiper forward to the end of its stroke.

23. In a labeling machine, the combination with a pair of independently reciprocable wipers located on opposite sides of the article to be labeled, means for moving one of said wipers inwardly in its own plane and completing the stroke thereof for the purpose of pasting the end of the label to the article to be labeled, and means for reciprocating the other wiper inwardly in its own plane and completing its motion after the operation of the first wiper is complete, whereby the second wiper will paste that end of the label over the end of the label operated upon by the first wiper.

24. In a labeling machine, the combination of a movable carrier for supporting articles to be labeled, of a wiping device comprising an arch projecting over the surface of said carrier, means for moving said arch with the carrier a short distance during the wiping operation, and a pair of wipers carried by the arch for wiping the label on an article supported by said carrier.

25. In a labeling machine, the combination of a rotary carrier provided at intervals apart with means for supporting bottles or the like thereon in upright position, a shaft passing axially through said carrier and extending beyond it, means for rotating said carrier, an oscillatable arm loosely mounted on the projecting end of said shaft, wipers carried by said arm, and means independent of said arm for actuating it to move the wipers along the path of the carrier, but more slowly on opposite sides of the bottles to permit the bottles to pass through said wipers.

26. In a labeling machine, the combination of a rotary horizontal carrier for a bottle to be labeled, an arm adapted to swing about the axis of said carrier, a fixed stand adjacent said carrier, wipers movably supported by said arm, means for oscillating said arm about its axis, and means carried by said stand for actuating the wipers as the arm moves.

27. In a labeling machine, the combination of a horizontal rotary table for carrying the articles to be labeled in upright position, an arm swinging about the center of said table, wipers carried by said arm, means for rotating said table, means actuated by the rotating means for oscillating said arm as the table rotates, a stationary member, cam devices on the stationary member, and means actuated by said cam devices and carried by the arm for moving the wipers as the arm oscillates.

28. In a labeling machine, the combination of a horizontal rotary table, means for rotating said table on a vertical axis, an arm pivoted on said vertical axis and extending over the table, connections from said operating means located under the table for oscillating said arm, and wipers carried by the arm.

29. In a labeling machine, the combination of a horizontal rotary table for carrying the articles to be labeled, means for rotating said table on a vertical axis, a stationary stand adjacent to the table, an arm pivoted to oscillate about said axis, wipers carried by said arm, a toe on said arm having a pin projecting down below the stand, and means operated by said rotating means and comprising an oscillating arm supported by the stand for moving said pin back and forth and oscillating the arm.

30. In a labeling machine, the combination of a rotary table, means for rotating it on a vertical axis, a stationary stand at the edge thereof, a cam member fixed on said stand, an arm pivoted to swing on the axis of said table and located over it, a wiper movably carried by said arm, means for oscillating said arm, a member carried by the arm and adapted to engage said cam during the oscillation of the arm, and means connected with said member for moving the wiper on the arm as the arm oscillates.

31. In a labeling machine, the combination with a rotary table for carrying the articles to be labeled, of a wiping device comprising an arch, means for moving said arch around with the table through a portion of a revolution, a pair of wipers carried by the arch, and means for moving said wipers transversely with respect to the motion of the arch.

32. In a labeling machine, the combination with a rotary table adapted to support articles to be labeled, means for applying labels to the articles while on the table, a clamping device on the table for clamping the articles to be labeled, and means for automatically operating said clamping device as the table rotates, of a feeding device located adjacent to the table, and means connected with the feeding device for feeding articles to be labeled one at a time in the plane of the table and leaving them on the table.

33. In a labeling machine, the combination with a rotary table for supporting articles to be labeled, means for applying labels to the articles while on the table and means on the table for clamping the articles thereto, of a feeding device located adjacent to the edge of the table and comprising means for feeding articles on the table in the plane thereof at a lower surface speed than the speed at which the table rotates, and means whereby said clamping device is automatically operated to clamp the article as soon as it reaches a certain position on the table.

34. In a labeling machine, the combination of a horizontal rotary table, a feeding device at the edge thereof, said feeding device being arranged and adapted to feed articles resting on surfaces in the plane of said table, means for operating said feeding device at a linear speed less than the linear speed of the circumference of the table, means for applying labels to the articles while on the table, and means whereby when an article is fed thereby on the table it is clamped to the table.

35. In a labeling machine, the combination with a rotary table, of a rotary feeding device at the side thereof in the plane of the table, means for rotating the feed device to move an article therein at a lower speed than that of the circumference of the table whereby the article is deposited on the table and then moved by the table away from the feed device, and means for applying labels to the articles while on the table.

36. In a labeling machine, the combination of a horizontal rotary table, a horizontal rotary feeding device at the edge thereof, said feeding device being arranged and adapted to feed articles resting on surfaces in the plane of said table, means for rotating said feeding device at a linear speed less than the linear speed of the circumference of the table, means whereby when an article is fed thereby on the table it is clamped to the table, means for applying labels to the articles while on the table and a rotary device for removing the articles from the table.

37. In a labeling machine, the combination with a horizontal rotary table for supporting the articles to be labeled, and means for applying labels to the articles while on the table, of an endless conveyer located adjacent to the edge of the table and in the plane of the supporting surface thereof, and means located between the conveyer and table for transferring articles from one to the other.

38. In a labeling machine, the combination with a horizontal rotary table for supporting the articles to be labeled, and means for applying labels to the articles while on the table, of an endless conveyer located in the plane of said table, means for taking articles from the conveyer and applying them to the table, and means for taking articles from the table and applying them to said conveyer.

39. In a labeling machine, the combination of a horizontal rotary table for supporting the articles to be labeled, and means for applying labels to the articles while on the table, of an endless conveyer located adjacent thereto, rotary means between the conveyer and table for gripping an article on the conveyer and moving it in a horizontal direction on the surface of the table, and rotary means located between the conveyer and table for engaging an article on the table and moving it on the conveyer.

40. In a labeling machine, the combination with a rotary table having a horizontal surface for supporting the articles to be labeled, of means on said surface for locating thereon the article to be labeled, means carried by the table for clamping the article thereon, and a label applying device comprising a pair of pickers for receiving a label, movable radially over the table to a position just in front of the locating means.

41. In a labeling machine, the combination with a rotary table for carrying the article to be labeled, of a labeling device comprising a pair of pickers located in a plane, means for moving said pickers in their own plane radially over the table to a position in which they stand at a slight angle to the vertical over the table, one on each side of the path of the article to be labeled, whereby as the table rotates the label will be engaged by the article thereon and removed from the pickers, and for then drawing the pickers back radially away from the table.

42. In a labeling machine, the combination with a movable carrier for carrying the article to be labeled, of a labeling device comprising a pair of pickers located in a plane, means for moving said pickers in their own plane to a position in which they stand one on each side of the path of the article to be labeled, whereby as the carrier moves forward the label will be engaged by the article thereon and removed from the pickers, and for then drawing the pickers back away from the carrier, said pickers remaining in stationary position while the article moves between them and engages the label thereon and thereafter moving slowly backward as the label is applied.

43. In a labeling machine, the combination with a movable carrier for carrying the article to be labeled, of a labeling device comprising a pair of pickers located in a plane, means for moving said pickers in their own plane to a position in which they stand one on each side of the path of the article to be labeled, whereby as the carrier moves the label will be engaged by the article thereon and removed from the pickers, and for then drawing the pickers back away from the carrier and holding them in stationary position beyond the edge of the carrier, and means for applying paste to the surfaces of said pickers while in that position.

44. In a labeling machine, the combination with traveling means for supporting an article to be labeled, of a pair of parallel pickers located in a plane and spaced apart, means for applying paste to the forward surfaces of said pickers, and means for then swinging said pickers in contact with the label and then withdrawing them therefrom, whereby the label will be withdrawn with them, and for then moving the pickers toward said support in their own plane until the pickers reach a position in which one is on each side of the path of an article to be labeled, whereby the movement of the article will withdraw the label from the pickers.

45. In a labeling machine, the combination with a pair of label pickers, and means for moving an article to be labeled between them, of means for turning said label pickers about longitudinal axes located substantially within the bodies of the pickers, out of the way of said article as it advances.

46. In a labeling machine, the combination of a movable member, a pair of label pickers carried thereby, said pickers being swiveled to said member to turn on longitudinal axes, means for moving said member into a position for the pickers to apply a label to an article, and means for turning said pickers on their axes to avoid engaging the article.

47. In a labeling machine, the combination of a reciprocable slide having a paste roller thereon, a pair of pickers, means for moving said pickers to a position parallel with the direction of motion of the paste roller in which the roller will move along their surfaces as the slide reciprocates, and means for then moving said pickers transversely to receive a label.

48. In a labeling machine, the combination of a movable slide having a paste roller thereon, a guide for guiding the slide to move in a straight path, a pair of pickers, means for moving said pickers to a position in the plane in which said slide moves so that the roller will move along their surfaces, and means for then moving them flatwise to the label holder to receive a label.

49. In a labeling machine, the combination of a paste roller, a pair of pickers in position to be engaged by the roller whereby paste will be applied thereto, a label holder in position for presenting a label to the pickers, a paste pot located substantially under the label holder and a pivot cover over the paste pot and under the label holder whereby the cover can be raised.

50. In a labeling machine, the combination of a paste pot, a rotary drum located therein, a slide movable up and down having a roller thereon adapted to engage the drum and to take paste therefrom when the slide is in its lowermost position, a pair of pickers, and means for moving said pickers to a position in which the roller will move along their surfaces when raised from the drum, for then moving them to receive a label, and for thereafter moving them edgewise to bring the label into position to apply it to the article to be labeled.

51. In a labeling machine, the combination of a paste pot, a slide movable up and down having a roller thereon adapted to receive paste, a pair of pickers, means for moving said pickers to a position in which the roller will move along their surfaces when raised and for then moving them forward to receive a label, said pickers being located directly over the paste pot at all times between the time of application of paste to the pickers and the engagement of the pickers with a label, whereby if the machine is stopped at any intermediate point the paste will drip from the pickers into the paste pot or on the cover.

52. In a labeling machine, the combination of a paste pot, a slide movable up and down having a roller thereon adapted to receive paste, a pair of pickers, means for moving said pickers to a position in which the roller will move along their surfaces when raised, and for then moving them forward to receive a label, said pickers being located directly over the paste pot at all times between the time of application of paste to the pickers and the engagement of the pickers with a label, whereby if the machine is stopped at any intermediate point the paste will drip from the pickers into the paste pot, and means for keeping the roller yieldingly pressed against both pickers when in contact with one.

53. In a labeling machine, the combination of a paste pot, a rotary drum located therein, a movable slide having a roller thereon adapted to engage the drum and to take paste therefrom, a pair of pickers, means for moving said pickers to a position in which the roller will move along their surfaces, said roller being mounted at one end on the slide, and yielding means for holding the other end of the roller against one of the pickers.

54. In a labeling machine, the combination of a paste pot, a rotary drum therein, a scraper in the paste pot for removing surplus paste from the drum, a roller adapted to rest on the drum for receiving paste therefrom, means for elevating said roller, a pair of pickers in position to be engaged by the roller when elevated whereby paste will be applied thereto, a label holder in position for presenting a label to the pickers, and a pivoted cover between the paste pot and the label holder.

55. In a labeling machine, the combination of a paste pot, a roller for receiving paste therefrom, means for elevating said roller, a pair of pickers in position to be engaged by the roller when elevated whereby paste will be applied thereto, and a label holder in position for presenting a label to the pickers, said pickers being movable over the paste pot to the label holder.

56. The combination of a label holder, means movable to one end of the label holder for taking a label therefrom, a feeler, means located in position to engage the feeler in the absence of an article to be labeled and operate it, and means whereby the operation of the feeler will effect withdrawal of the label holder from the reach of the label applying device.

57. In a labeling machine, the combination of a table for the articles to be labeled, a label holder, means movable to one end of the label holder for taking a label therefrom and carrying it over the surface of said table, a feeler, means located on the table in position to engage the feeler in the absence of an article to be labeled and operate it, and means whereby the operation of the feeler will effect withdrawal of the label holder from the reach of the label applying device.

58. In a labeling machine, the combination of a table for the articles to be labeled, a movably mounted label holder, a picker movable into position to engage the label at the end of the label holder and carry it over the table, means for moving said label holder back into a position out of reach of the picker, a finger, means movable with the table for operating the finger when the table moves without an article to be labeled thereon, and means controlled by said finger for preventing the operation of said label moving device when an article to be labeled is in position but permitting its operation when the table performs a cycle of operation without an article to be labeled thereon.

59. In a labeling machine, the combination of a movable table for supporting the articles to be labeled, a clamping device thereon for said articles, a finger located in position to be engaged by the clamping device when there is no article to be labeled in position as the table moves, a shaft on which said finger is mounted, a lever having a roll slidably mounted thereon, means whereby the turning of said shaft will slide said roll, a power-operated shaft, a cam thereon and a concentric collar in position to support said roll at its two extreme positions, whereby when said finger is moved the roll will rest on the collar and when it is not moved the roll will rest on the cam, a movable bracket, means whereby when said shaft is moved by the roller and cam the bracket will be drawn backward, and a label holding device carried by said bracket.

60. In a labeling machine, the combination of a movable table for supporting the articles to be labeled, a clamping device thereon for said articles, a finger located in position to be engaged by the clamping device when there is no article to be labeled in position as the table moves, and to be passed by the clamping device when it is clamping an article, a label applying device, and means whereby said finger controls the operation of the label applying device.

61. The combination with a moving support carrying articles to be labeled, of a label picker movable as a whole transversely to the direction of motion of said articles, and also capable of swinging on an axis parallel to the plane of said transverse motion, and pickers mounted thereon and capable of turning on axes independently of each other, said axes being transverse to the first mentioned axis.

62. The combination with a moving support carrying bottles in a vertical position, of a label picking device movable as a whole in a plane transverse to the direction of motion of the bottles and adapted to swing about an axis in said plane parallel with the plane of the moving support, and pickers mounted on said picking device and capable of swinging on axes parallel with the axis of the bottle independently of each other.

63. In a label picking device, the combination of a support for the articles to be labeled, means for moving said support, a shaft located transverse to the direction of motion of the articles, a label picker support slidable and pivoted on said shaft, means for swinging said support on said shaft, means for sliding it on said shaft toward the path of the article to be labeled, and a pair of pickers pivoted on said support on axes transverse to said shaft.

64. In a labeling machine, the combination with a support for the articles to be labeled, of a label picker support movably mounted, a picker adapted to swing about an axis on said label picker support and having a projection extending therefrom, a spring for holding said projection in a certain position, and a movable member adapted to engage said projection and swing the picker on its axis.

In testimony whereof we have hereunto set our hands in the presence of two subscribing witnesses.

JOHN EMANUEL JOHNSON.
CHARLES H. OSLUND.

Witnesses:
 CHAS. T. HAWLEY,
 C. FORREST WESSON.